(12) United States Patent
Elsner

(10) Patent No.: US 7,971,707 B2
(45) Date of Patent: Jul. 5, 2011

(54) SNAP-IN WEAR GUIDE

(75) Inventor: Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 69 days.

(21) Appl. No.: 12/387,745

(22) Filed: May 7, 2009

(65) Prior Publication Data

US 2010/0282576 A1 Nov. 11, 2010

(51) Int. Cl.
 *B65G 15/62* (2006.01)
(52) U.S. Cl. ......................................................... 198/841
(58) Field of Classification Search .................. 198/841, 198/840, 836.1–836.4
See application file for complete search history.

(56) References Cited

U.S. PATENT DOCUMENTS

| | | | |
|---|---|---|---|
| 3,515,013 A | 6/1970 | Wykes | |
| 3,885,837 A * | 5/1975 | Mellor | 384/42 |
| 3,921,468 A | 11/1975 | Wright | |
| 4,850,475 A * | 7/1989 | Lupo et al. | 198/778 |
| 4,961,492 A | 10/1990 | Wiseman et al. | |
| 5,137,145 A | 8/1992 | Clopton | |
| 5,186,314 A | 2/1993 | Clopton | |
| 5,782,340 A * | 7/1998 | Dolan | 198/841 |
| 5,803,687 A * | 9/1998 | Ledingham | 411/85 |
| 6,105,757 A * | 8/2000 | Ledingham | 198/836.3 |
| 6,533,108 B1 * | 3/2003 | Ledingham | 198/841 |
| 6,848,572 B1 | 2/2004 | Sisson, Jr. et al. | |
| 7,637,368 B2 * | 12/2009 | Andreoli | 198/836.3 |
| 2006/0006050 A1 | 1/2006 | Sedlacek | |

* cited by examiner

*Primary Examiner* — Mark A Deuble
(74) *Attorney, Agent, or Firm* — Hodgson Russ LLP

(57) ABSTRACT

A wear guide assembly for use with a plastic modular conveying belt. The wear guide snap fits into position onto a support channel. The wear guide has a back wall, a first wall extending from the back wall, and a second wall extending from the back wall. The assembly also includes a support channel with a back wall, a first side wall, and a second side wall. The first and second side walls have distal portions bordering an opening. The first and second side walls have opposed projections extending from the distal portions that form first and second shoulders.

27 Claims, 5 Drawing Sheets

SNAP-IN WEAR GUIDE

FIELD OF THE INVENTION

The present invention pertains generally to conveying systems and specifically to wear guides for plastic modular belts.

BACKGROUND OF INVENTION

For modular conveying belts, it is important to reduce the friction caused by the belt sliding over the support structure. This reduction in friction reduces the power required to drive the belt and at the same time reduces the wear on the modular belt. For this purpose low friction, plastic wear guides or wear strips are fixed to the support structure and provide the support surface for the belt. Wear guides are usually constructed of extruded or machined plastic profiles, and various profile shapes are used. The most common shapes are flat strips that are bonded or screwed to the metal support. As shown in FIG. 1, labeled prior art, the plastic guides 10 may be joined to a metal profile 13 (C-shape or U-shape) by shifting the plastic guide 10 longitudinally into the metal profile 13. Some specific arrangements using specialized frame profiles are disclosed in U.S. Pat. Nos. 5,137,145; 5,186,314; 6,848,572; and 4,961,492. As shown in FIGS. 2A and 2B, there have also been wear strips 16 with a C-shape or U-shape that are fixed to a flat metal strip 19 by pressing the wear strip onto it in the direction of arrow 20. This solution typically requires additional fasteners (at least one per profile section) in order to prevent the profile from slipping off the metal strip 19.

There is a need for U-shaped plastic wear guides in applications where it is essential for the running belt to be prevented from flipping up or lifting during operation. This risk is particularly significant for radius belts and chains when running through a curve. In the curve, radial forces are pressing the chain or belt against the inner guide.

The prior art solutions discussed above are generally costly to produce and in some cases difficult to install. The issues with installation are particularly relevant for long guide profiles that have to be shifted along the entire length of the metal profile. Also, with a curved profile, installation is even more difficult. In order to provide for easier installation, it is usually necessary to provide some clearance between the metal channel and the plastic guide profile. However, this space may lead to unwanted vibration when the belt slides along the plastic guide profile.

The prior art version shown in FIGS. 2A and 2B also does not fulfill all of the desired requirements with respect to accuracy and rigidness because the plastic profiles of that shape tend to distort during installation and may require additional pins and screws to be secured to the flat steel. These additional components result in additional work and cost.

Accordingly, there is a need for an improved design that is economical, easy to install, and that prevents the running belt from flipping up or lifting during operation.

SUMMARY OF INVENTION

The present invention meets the above described need by providing a wear guide assembly that snap fits into position onto a support channel. The wear guide has a back wall, a first wall extending from the back wall, and a second wall extending from the back wall. The assembly also includes a support channel with a back wall, a first side wall, and a second side wall. The first and second side walls have distal portions bordering an opening. The first and second side walls have opposed projections extending from the distal portions that form first and second shoulders. In use the wear guide may be installed by inserting the wear guide into the channel with the back wall facing the opening and the wear guide angled such that the second wall fits inside the second side wall of the channel. Next, the wear guide is rotated such that the first wall elastically deflects inward as it passes by the first projection on the channel and then snaps into position in engagement with the first shoulder. Alternatively, the first and second walls may both have elastic regions that allow the walls to elastically deform inward such that the guide can be installed by pushing it generally straight into the channel with the back wall facing the opening. When the guide is pushed into the channel in this manner, the first and second walls elastically deform inward and then spring outward once the end of the walls passes the projections where the first and second walls engage with the first and second shoulders, respectively.

BRIEF DESCRIPTION OF THE DRAWING FIGURES

The invention is illustrated in the drawings in which like reference characters designate the same or similar parts throughout the figures of which:

DETAILED DESCRIPTION OF THE INVENTION

Figure 1:
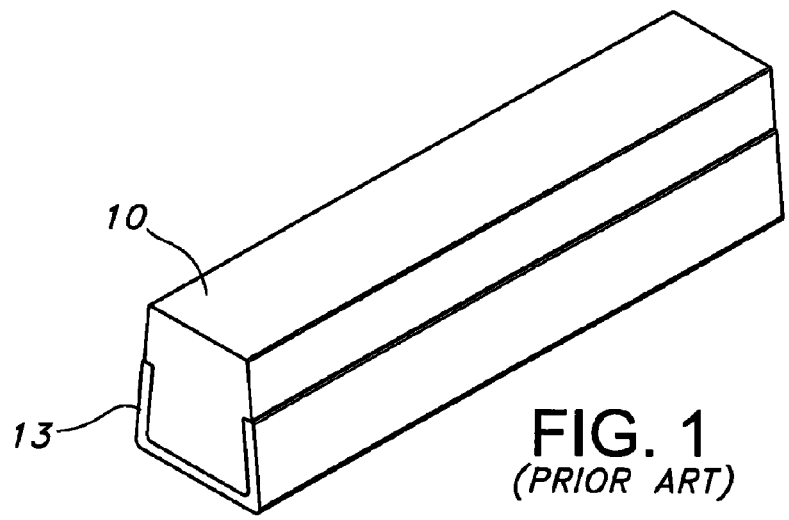
FIG. 1 is a perspective view of a prior art wear guide.
Figure 2A:
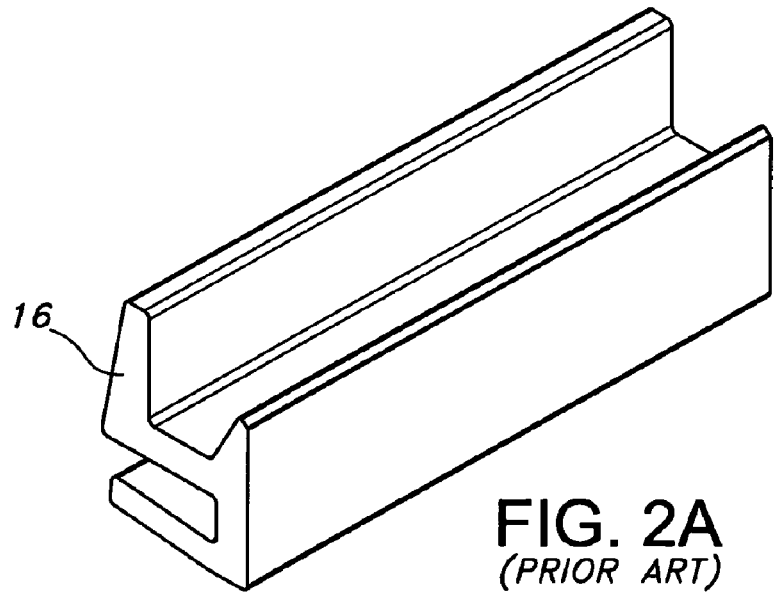
FIG. 2A is a perspective view of another prior art wear guide.
Figure 2B:
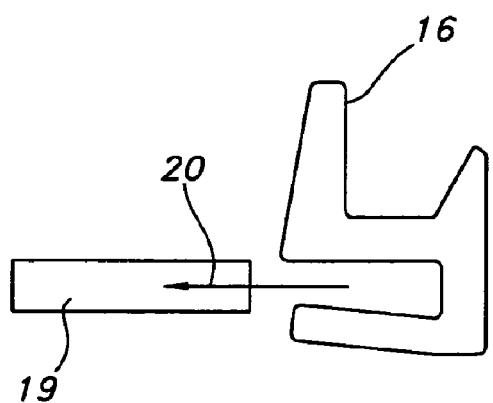
FIG. 2B is a side elevational view of the guide shown in FIG. 2A.
Figure 3:
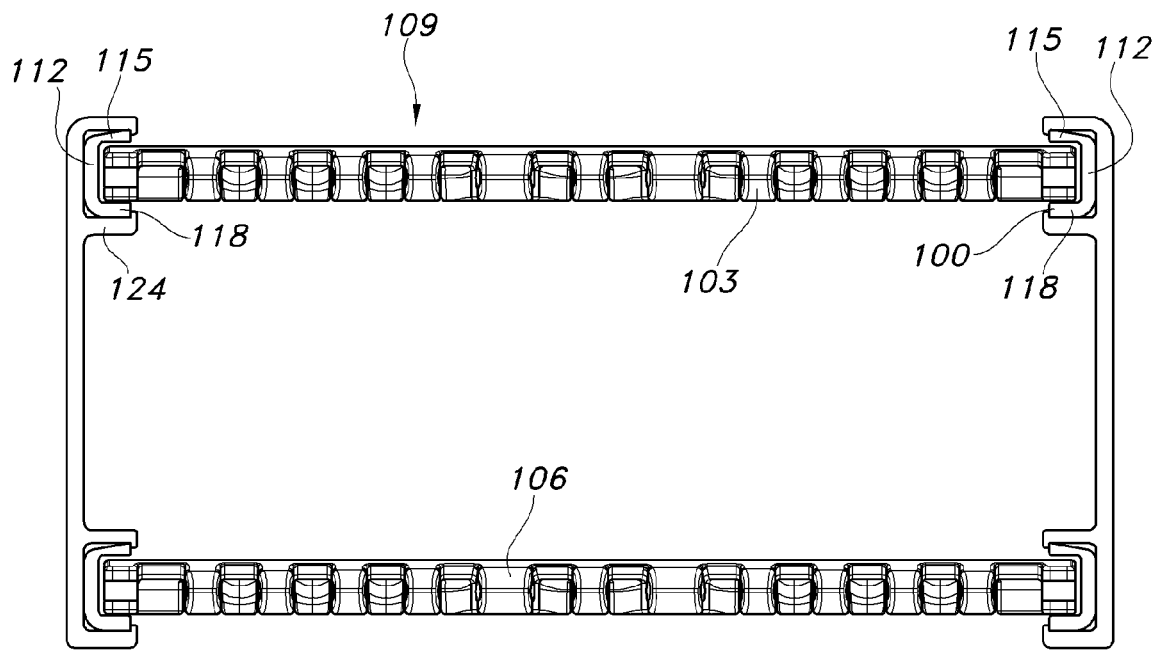
FIG. 3 is an elevational view of a first embodiment of the guide of the present invention.

Referring to FIG. 3, the guide 100 of the present invention is shown in use with the conveying side 103 and the return side 106 of a modular conveying belt 109. The modular conveying belt 109 may be constructed of rows of bricklayed modules as described herein and as will be evident to those of ordinary skill in the art based on this disclosure. For radius belts and chains, it is essential to prevent the running belt 109 from flipping up or lifting during operation. By using a C-shaped guide 100, this tilting or lifting is prevented. The wear guide 100 may be constructed of low wear and/or low friction materials such as high density polyethylene (HDPE) or other thermoplastic materials that may be mixed with low wear and/or low friction components such as TEFLON (PTFE) or lubricants. The wear guide 100 is constructed with a back wall 112 that is connected to a first wall 115 and a second wall 118. The walls 115, 118 extend approximately perpendicular to the back wall 112. The guide 100 or parts of the guide 100 may be constructed of an elastic material for installation into the channel 124 as described in greater detail below.

The guide 100 of the present invention snaps into a C-shaped metal channel 124. The channel 124 may be constructed from any metal. Suitable metals include steel or aluminum. The channel 124 may be constructed from metal sheets or may be extruded or cast. The channel 124 may be part of a larger machine and thus may also be an integrated element of a larger conveyor frame construction. The C-shaped channel 124 may also be constructed of any suitable non-metallic materials such as reinforced plastics.

Turning to FIGS. 4A-4D, the wear guide 100 of the present invention is shown during a typical installation. The wear guide 100 has a back wall 112, and a pair of walls 115, 118 extending from the back wall 112. First wall 115 may be provided with an area of reduced thickness $T_1$ to provide an elastic portion 127 capable of bending to create a "snap fit" effect when the guide 100 is installed in the channel 124. The second wall 118 that provides the primary bearing surface for the belt 109 may be provided with an increased thickness $T_2$ in order to enhance the wear characteristics and durability of the guide 100. The back wall 112 may also have an increased thickness $T_3$ to strengthen the guide 100.

The channel 124 has a C-shaped profile with a back wall 130 and a pair of opposed side walls 133 and 136. The side walls 133 and 136 extend to distal portions 139 and 142. The distal portions 139 and 142 define an opening 145 that receives the guide of the present invention. The distal portions 139 and 142 may include projections 148 and 151 that extend inward and form shoulders 154 and 157. As will be described below, the shoulders 154 and 157 engage with the ends of the walls 115 and 118 on the guide 100 after the guide 100 is installed in the channel 124, and this engagement holds the guide 100 firmly in place after it is "snapped" into position. Side wall 136 may include a recessed portion 160 to provide clearance for the leg 118 of the guide 100 during installation.

Figures 4A, 4B:
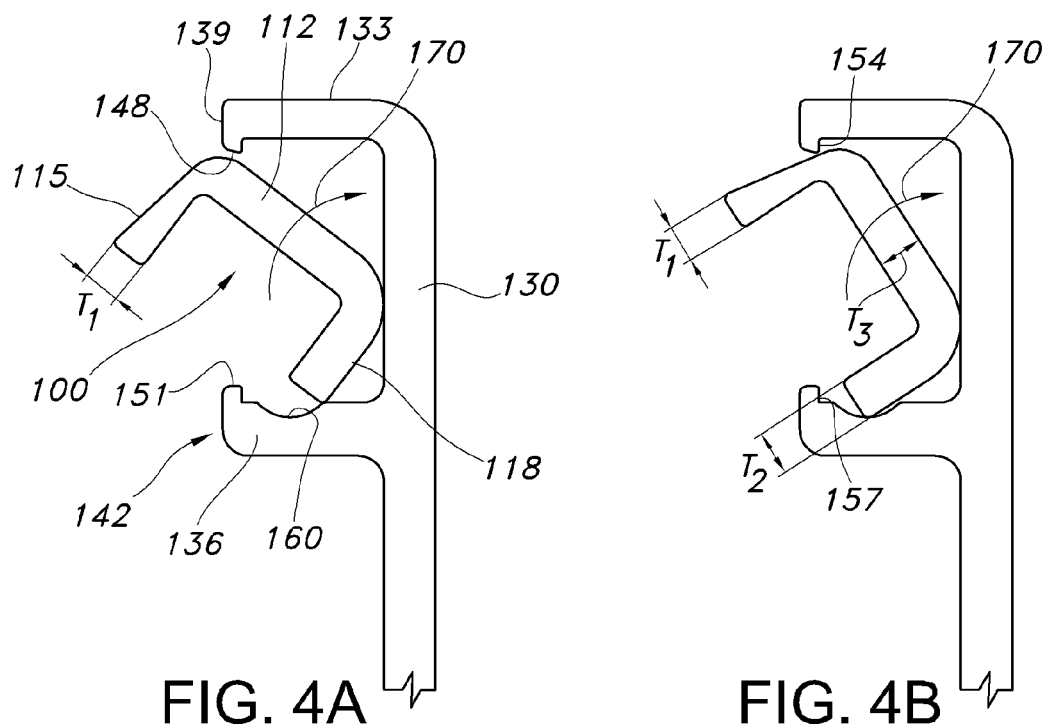
FIG. 4A is a side elevational view showing an initial step during installation of the guide.
FIG. 4B is a side view of a second step during installation.
Figure 4C:
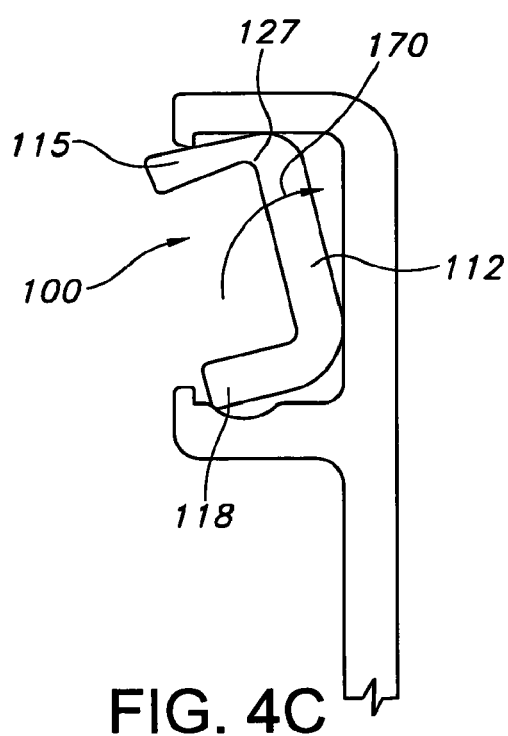
FIG. 4C is a side elevational view of a further step.
Figure 4D:
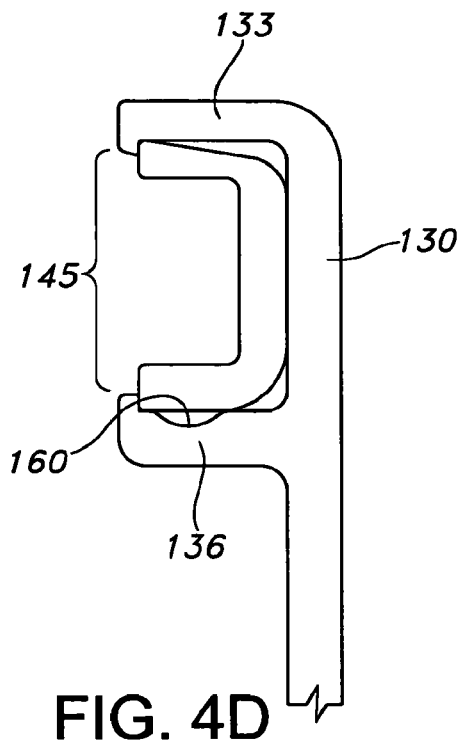
FIG. 4D is a side elevational view showing the guide installed in the C-shaped channel of the present invention.

Referring to FIGS. 4A and 4B, the guide of the present invention is installed in the channel 124 by inserting it through the opening in the channel 124 with the back of the guide facing the opening. The guide is rotated at an angle such that the second wall 118 fits inside the channel 124. As shown in FIG. 4B, the second wall 118 fits into the recess 160 in the channel to provide clearance for the first wall 115. As shown in FIG. 4C, as the guide 100 is rotated in the direction of arrow 170, the first wall 115 is elastic such that it bends inward as it passes the projection 148 on the first side wall 133 of the channel 124. Once the wall 115 clears the projection 148 on the side wall 133, the wall 115 "snaps" into position behind the projection 148 and engages with the shoulder 154 as shown in FIG. 4D. At this point the second wall 118 is clear of the recess 160 and is held firmly against the shoulder 157 on the second side wall 136 of the channel 124. Accordingly, the C-shaped channel 124 is formed to hold the guide 100 tightly and firmly in place such that there is no vibration. In addition because the guide 100 is held in place under tension, noise created by vibration is eliminated.

Figure 5:
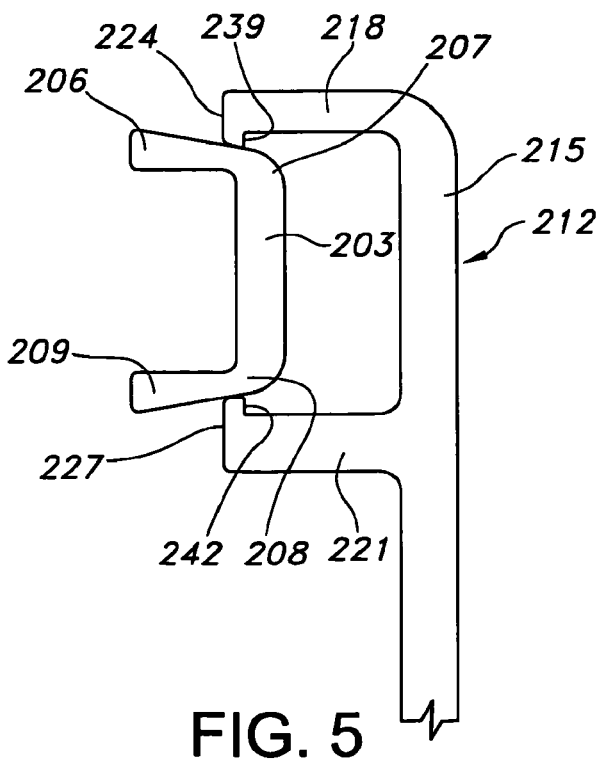
FIG. 5 is a side elevational view of an alternate embodiment of the present invention.
Figure 6:
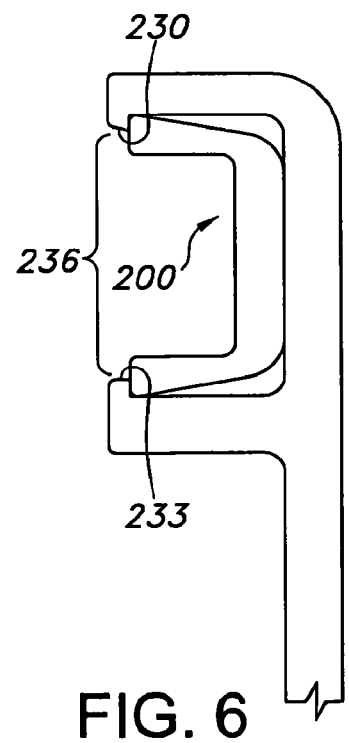
FIG. 6 is another view of the embodiment shown in FIG. 5.

Turning to FIGS. 5 and 6, an alternate embodiment of the invention is shown. A guide 200 has a back wall 203 and a pair of symmetrical first and second walls 206 and 209 extending therefrom. The walls 206 and 209 have portions 207, 208 with reduced thicknesses such that elastic portions of the guide 200 are formed. A C-shaped channel 212 receives the guide 200. The C-shaped channel 212 has a back wall 215 and a pair of opposed side walls 218 and 221. The side walls 218 and 221 have distal portions 224 and 227. Projections 230 and 233 extend inward from the distal portions 224 and 227 and border the opening 236 in the channel 212. The projections 230 and 233 form shoulders 239 and 242. The guide 200 may be pushed into the channel 212 in the direction of arrow 243. The elastic portions of the walls 206, 209 of the guide 200 allow the walls 206, 209 to bend inward so that they can be inserted into the channel 212 and pass by the end of the projections 230 and 233. Once the walls 206, 209 pass by the end of the projections 230 and 233, the ends of the walls 206, 209 spring outward and "snap" into position behind the projections 230, 233. In this manner, the guide 200 is held firmly in position against the shoulders 239, 242 in the channel 212.

Figures 7A, 7B:
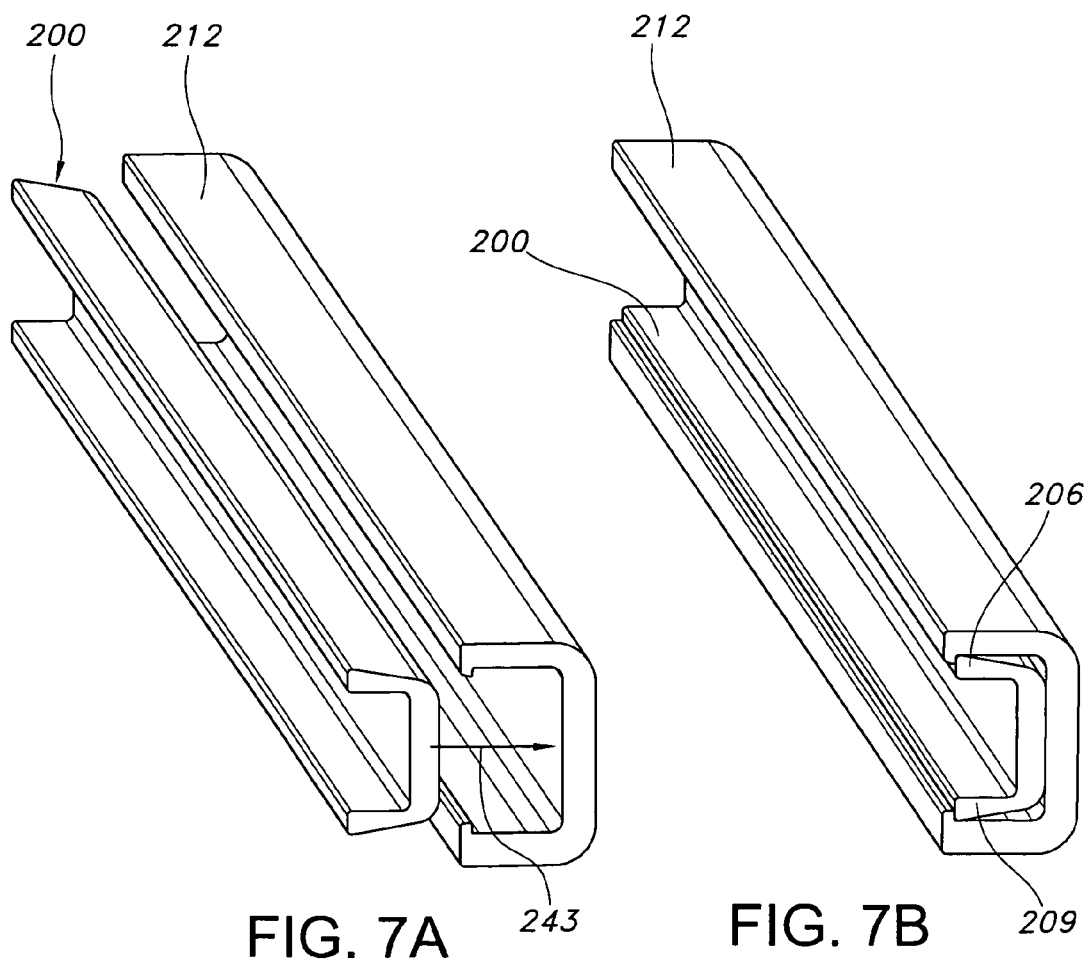
FIG. 7A is a perspective view of the guide of the present invention.
FIG. 7B is another perspective view of the guide of the present invention.

As shown in FIGS. 7A and 7B, the guide 200 and the channel 212 may be constructed of a predetermined length and therefore the guide can be part of a larger machine frame construction. The guide 200 may be inserted in the direction of arrow 243 which provides an easier installation as compared to the prior art methods described above.

Figure 8:
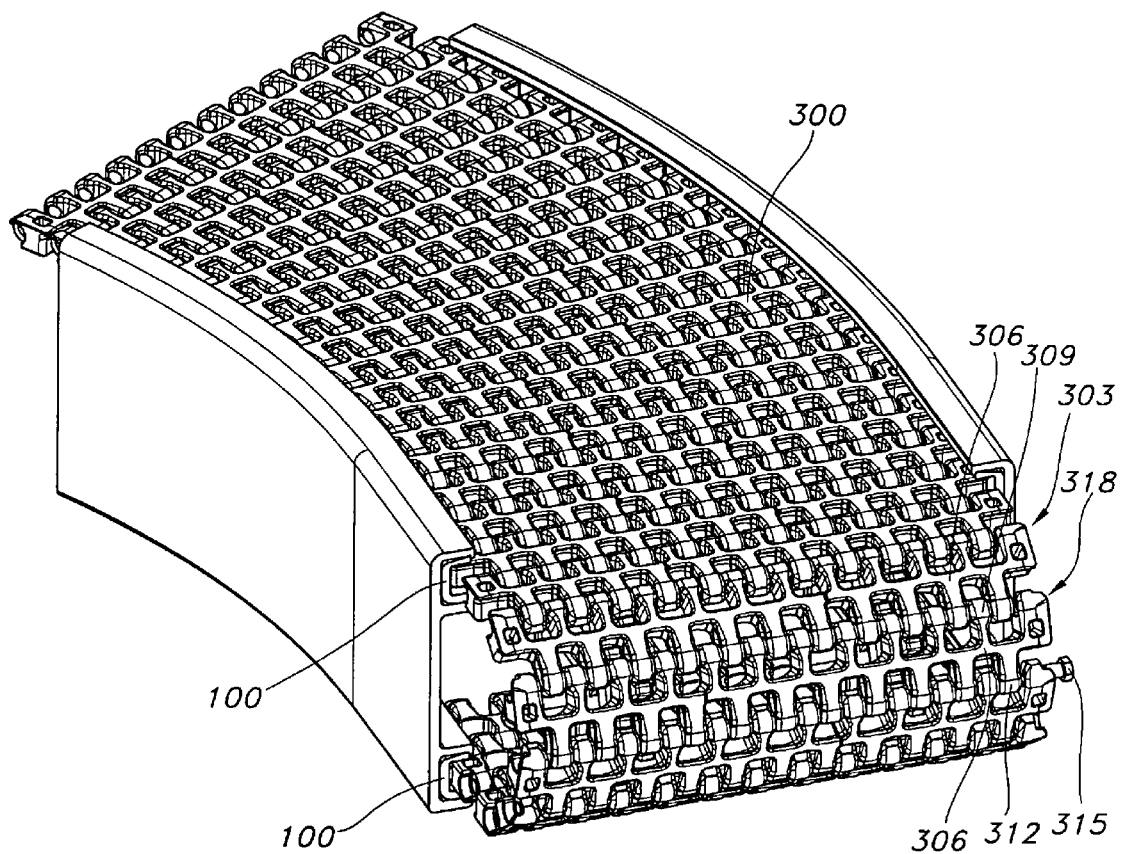
FIG. 8 is a perspective view of a radius belt traversing over the guide of the present invention.

Turning to FIG. 8, the guide 100, 200 of the present invention is shown in a curved portion of a belt run for a plastic modular radius belt 300. As shown, the belt 300 is constructed of a plurality of belt modules 303 having intermediate sections 306 with a first plurality of link ends 309 extending in a first direction and a second plurality of link ends 312 extending in a second direction opposite the first direction. The modules 303 are arranged in rows and the link ends 309, 312 are intercalated with the link ends 309, 312 on adjacent rows of modules 303. The rows are pivotally connected by pivot rods 315 (shown partially extracted) that extend through aligned transverse pivot rod openings 318. The rows of modules 303 may be arranged in bricklayed fashion and connected to form an endless belt 300 capable of pivoting to articulate about a sprocket (not shown). The guide 100, 200 of the present invention provides a wear strip and prevents the belt 300 from flipping up or lifting as it traverses the curve.

What is claimed is:

1. A wear guide assembly, comprising:
a wear guide having a back wall, a first wall extending from the back wall and having a distal portion and a proximal portion, the proximal portion of the first wall having an elastic portion, a second wall extending from the back wall and having a distal portion, an end of the distal portion, and a proximal portion;
a support channel having a back wall, a first side wall, and a second side wall, the first and second side walls having distal portions bordering an opening, the first and second side walls having opposed projections extending from the distal portions forming first and second shoulders bordering the opening;
wherein the wear guide fits into the channel such that the distal portion of the first wall engages with the first shoulder on the channel and the end of the distal portion of the second wall engages with the second shoulder on the channel.

2. The wear guide assembly of claim 1, wherein the second side wall of the channel has a recess defined therein.

3. The wear guide assembly of claim 1, wherein the proximal portion of the first wall has a reduced thickness area.

4. The wear guide assembly of claim 3, wherein the second wall has a thickness greater than the reduced thickness area of the first wall.

5. The wear guide assembly of claim 1, wherein the proximal portion of the second wall has a reduced thickness area such that the second wall has an elastic portion.

6. The wear guide assembly of claim 1, wherein the wear guide is constructed of high density polyethylene (HDPE).

7. The wear guide assembly of claim 1, wherein the wear guide is constructed of a composition including TEFLON (PTFE).

8. The wear guide assembly of claim 1, wherein the channel is C-shaped.

9. The wear guide assembly of claim 1, wherein the channel is constructed of metal.

10. The wear guide assembly of claim 8, wherein the channel is constructed of a metal selected from the group consisting of aluminum and steel.

11. The wear guide assembly of claim 8, wherein the channel is constructed by a method selected from the group of extruding, casting and machining.

12. The wear guide assembly of claim 8, wherein the channel is constructed of reinforced plastic.

13. A modular conveying belt system, comprising:
a modular belt comprising a plurality of belt modules having an intermediate section, a first plurality of link ends extending from the intermediate section in a first direction, a second plurality of link ends extending in a second direction opposite the first direction, the first and second link ends offset from each other such that the first link ends of a first module are capable of intercalating between the second ends of an adjacent belt module, the first and second link ends having transverse pivot rod openings, the transverse pivot rod openings of intercalated modules capable of aligning such that adjacent modules are pivotally connected by a pivot rod, the pivotally connected modules extending from a first side to a second side opposite the first side and forming rows of pivotally attached modules capable of forming an endless belt,
a plurality of wear guide assemblies comprising a wear guide having a back wall, a first wall extending from the back wall and having a distal portion and a proximal portion, the proximal portion of the first wall having an elastic portion, a second wall extending from the back wall and having a distal portion, an end of the distal portion, and a proximal portion;
a plurality of support channels having a back wall, a first side wall, and a second side wall, the first and second side walls having distal portions bordering an opening, the first and second side walls having opposed projections extending from the distal portions forming first and second shoulders bordering the opening,
wherein the wear guide snap fits into the channel such that the distal portion of the first wall engages with the first shoulder on the channel and the end of the distal portion of the second wall engages with the second shoulder on the channel.

14. The modular conveying belt system of claim 13, wherein the second side wall of the channel has a recess defined therein.

15. The modular conveying belt system of claim 13, further comprising a reduced thickness area in the proximal portion of the first wall.

16. The modular conveying belt system of claim 13, wherein the second wall has a thickness greater than the reduced thickness area of the first wall.

17. The modular conveying belt system of claim 13, wherein the proximal portion of the second wall has a reduced thickness area such that the second wall has an elastic portion.

18. The modular conveying belt system of claim 13, wherein the wear guide is constructed of high density polyethylene (HDPE).

19. The modular conveying belt system of claim 13, wherein the wear guide is constructed of a composition including TEFLON (PTFE).

20. The modular conveying belt system of claim 13, wherein the channel is C-shaped.

21. The modular conveying belt system of claim 13, wherein the channel is constructed of metal.

22. The modular conveying belt system of claim 13, wherein the channel is constructed of a metal selected from the group consisting of aluminum and steel.

23. The modular conveying belt system of claim 21, wherein the channel is constructed by a method selected from the group of extruding, casting and machining.

24. The modular conveying belt system of claim 13, wherein the channel is constructed of reinforced plastic.

25. A method of providing a wear guide for a plastic modular belt, the method comprising:
providing a modular belt comprising a plurality of belt modules having an intermediate section, a first plurality of link ends extending from the intermediate section in a first direction, a second plurality of link ends extending in a second direction opposite the first direction, the first and second link ends offset from each other such that the first link ends of a first module are capable of intercalating between the second ends of an adjacent belt module, the first and second link ends having transverse pivot rod openings, the transverse pivot rod openings of intercalated modules capable of aligning such that adjacent modules are pivotally connected by a pivot rod, the pivotally connected modules extending from a first side to a second side opposite the first side and forming rows of pivotally attached modules capable of forming an endless belt,
providing a plurality of wear guides having a back wall, a first wall extending from the back wall and having a distal portion and a proximal portion, a second wall extending from the back wall and having a distal portion, an end of the distal portion, and a proximal portion;
providing a plurality of support channels having a back wall, a first side wall, and a second side wall, the first and second side walls having distal portions bordering an opening, the first and second side walls having opposed projections extending from the distal portions forming first and second shoulders bordering the opening,
wherein at least one of the first and second wall have an elastic portion;
inserting the guide into the channel with the back wall facing the opening and elastically deforming at least one of the first and second walls to slide it past one of the first and second projections until it springs outward, and,
wherein the wear guide snap fits into the channel such that the distal portion of the first wall engages with the first shoulder on the channel and the end of the distal portion of the second wall engages with the second shoulder on the channel.

26. The method of claim 25, further comprising:
inserting the wear guide into the channel at an angle such that one of the first and second walls fits inside one of the first and second side walls of the channel.

27. The method of claim 26, further comprising:
rotating the wear guide such that one of the first and second walls elastically deforms and slides past one of the first and second side walls of the channel to a position where it clears the projection on the channel and moves outward into engagement with one of the first and second shoulders.

* * * * *